(12) United States Patent
Miyajima et al.

(10) Patent No.: US 6,828,734 B2
(45) Date of Patent: Dec. 7, 2004

(54) DISPLAY DEVICE

(75) Inventors: Yasushi Miyajima, Gifu (JP); Ryoichi Yokoyama, Ogaki (JP)

(73) Assignee: Sanyo Electric Company, Ltd., Osaka (JP)

( * ) Notice: Subject to any disclaimer, the term of this patent is extended or adjusted under 35 U.S.C. 154(b) by 0 days.

(21) Appl. No.: 10/390,884

(22) Filed: Mar. 19, 2003

(65) Prior Publication Data

US 2003/0201728 A1 Oct. 30, 2003

(30) Foreign Application Priority Data

Apr. 24, 2002 (JP) ........................................ 2002-122148

(51) Int. Cl.$^7$ ........................... G09G 3/10; G02F 1/1345
(52) U.S. Cl. ............................... 315/169.2; 315/169.3; 349/149
(58) Field of Search ......................... 315/169.2, 169.3; 345/76, 87, 92, 36; 313/400, 500, 505; 349/149, 139, 42; G09G 3/10; G02F 1/1345

(56) References Cited

U.S. PATENT DOCUMENTS 5,751,381 A * 5/1998 Ono et al. ..................... 399/46
6,239,779 B1 * 5/2001 Furuya et al. ................ 345/87

* cited by examiner

Primary Examiner—Don Wong
Assistant Examiner—Trinh Vo Dinh
(74) Attorney, Agent, or Firm—Morrison & Foerster LLP

(57) ABSTRACT

Various bus lines are disposed in the same layer as the layer of the pixel electrode. The peripheral driving circuit is configured by using a layer below the pixel electrode, including the layer of the gate electrode, the data line and the active layer of a TFT. The HVDD bus line is superimposed on the H scanner, the VSS bus line on the HSW circuit and the V scanner, the pre-charge data bus line on the PSW circuit, and the VVDD bus line on the V scanner. This increases the flexibility of the disposition of the bus lines for supplying the source voltages to the peripheral driving circuit, leading to the reduction of the framing area.

10 Claims, 3 Drawing Sheets

US 6,828,734 B2

DISPLAY DEVICE

BACKGROUND OF INVENTION

1. Field of the Invention

This invention relates to a display device, especially to a technology for reducing display device size by improving layout flexibility of peripheral driving circuits.

2. Description of the Related Art

A flat panel display device including a reflection type active matrix liquid crystal display device (referred to as LCD hereinafter) can be thin, small and light, and it operates with low-power consumption. The LCD has been used as a display part in various devices such as mobile information device. The LCD, whose pixel has a switching element and a thin film transistor, is known as an active matrix type. The panel of the active matrix display device is highly reliable for maintaining displayed contents of the pixels, which provides the active matrix display device with high display quality.

FIG. 3 shows an equivalent circuit of a pixel in the active matrix LCD. Each pixel has a thin film transistor (TFT) 11 connected to a gate line and a data line. When the TFT 11 is turned on by a selection signal outputted to the gate line, the data corresponding to the display content is supplied to a liquid crystal capacitance (Clc) 15 from the data line through the TFT 11. It is necessary to accurately keep the display data from the time when the TFT 11 is first selected for writing to the time when the TFT 11 is selected again in the next sequence. Therefore, a storage capacitance (Csc) 13 is connected to the TFT 11 in series with the liquid crystal capacitance Clc 15.

FIG. 4 is a plan view showing the configuration of a LCD panel 300 as a whole. A display region 100 is disposed in the middle of the LCD panel 300. The display pixels are disposed in a matrix configuration on the display region 100. And peripheral driving circuits including an H scanner (a horizontal driving circuit) 101, a HSW circuit 102, a PSW circuit 103, a V scanner (a vertical driving circuit) 104 and a group of input terminals 105 are disposed near the inside wall of the display region 100.

The H scanner 101 generates a horizontal scanning signal. The HSW circuit 102 is a switching circuit for supplying a video signal to the data line based on the horizontal scanning signal. The PSW circuit 103 is a switching circuit, which is connected to all the data lines and turns them on and off simultaneously. When the PSW circuit 103 is on, it supplies a pre-charge data (pre-charge signal) from a pre-charge bus line to all the data lines.

The V scanner 104 is a circuit for outputting a vertical scanning signal, which becomes high for each of the horizontal period, as the selection signal described above is applied to the gate line.

An HVDD (a source voltage for the H scanner), a VSS (an earth voltage), the pre-charge data, a VVDD (a source voltage for the V scanner) and a VCOM (a common voltage) are inputted from the group of input terminals 105, and an HVDD bus line 110, a VSS bus line 111, the pre-charge data bus line 112, a VVDD bus line 113, and a COM bus line 114 corresponding to the above mentioned voltages are disposed around the display region 100. These bus lines 110–114 supply the data and the voltages necessary for peripheral driving circuits.

However, since various bus lines 110–114 are formed as a part of the wiring layer that is made of poly-silicon or an aluminum and is also used for the peripheral driving circuit, there is a certain restriction in terms of the circuit layout. Additionally, it is necessary to reduce the time constant of these bus lines 110–114. Therefore, for a larger LCD panel, a wider wiring area is required, enlarging the framing area of the LCD panel 300.

SUMMARY OF THE INVENTION

The invention provides a display device having a plurality of wiring layers. The display device includes a display region having a plurality of display pixels and a peripheral driving circuit that supplies a driving signal to each of the display pixels and is disposed outside the display region. The display device also includes a bus line that supplies a voltage to the peripheral driving circuit and a pixel electrode disposed for each of the display pixels. The bus line and the pixel electrodes are disposed in one of the wiring layers, and at least a portion of the peripheral driving circuit is disposed in a wiring layer that is disposed below the wiring layer of the bus line and the pixel electrodes.

The invention also provides a reflection-type display device having a plurality of wiring layers. The display device includes a display region having a plurality of display pixels and a peripheral driving circuit that supplies a driving signal to each of the display pixels and is disposed outside the display region. The display device also includes a bus line that supplies a voltage to the peripheral driving circuit and a reflection pixel electrode disposed for each of the display pixels. A wiring layer of the reflection pixel electrode includes a portion of the peripheral driving circuit or a portion of the bus line.

DESCRIPTION OF THE INVENTION

Figure 1:
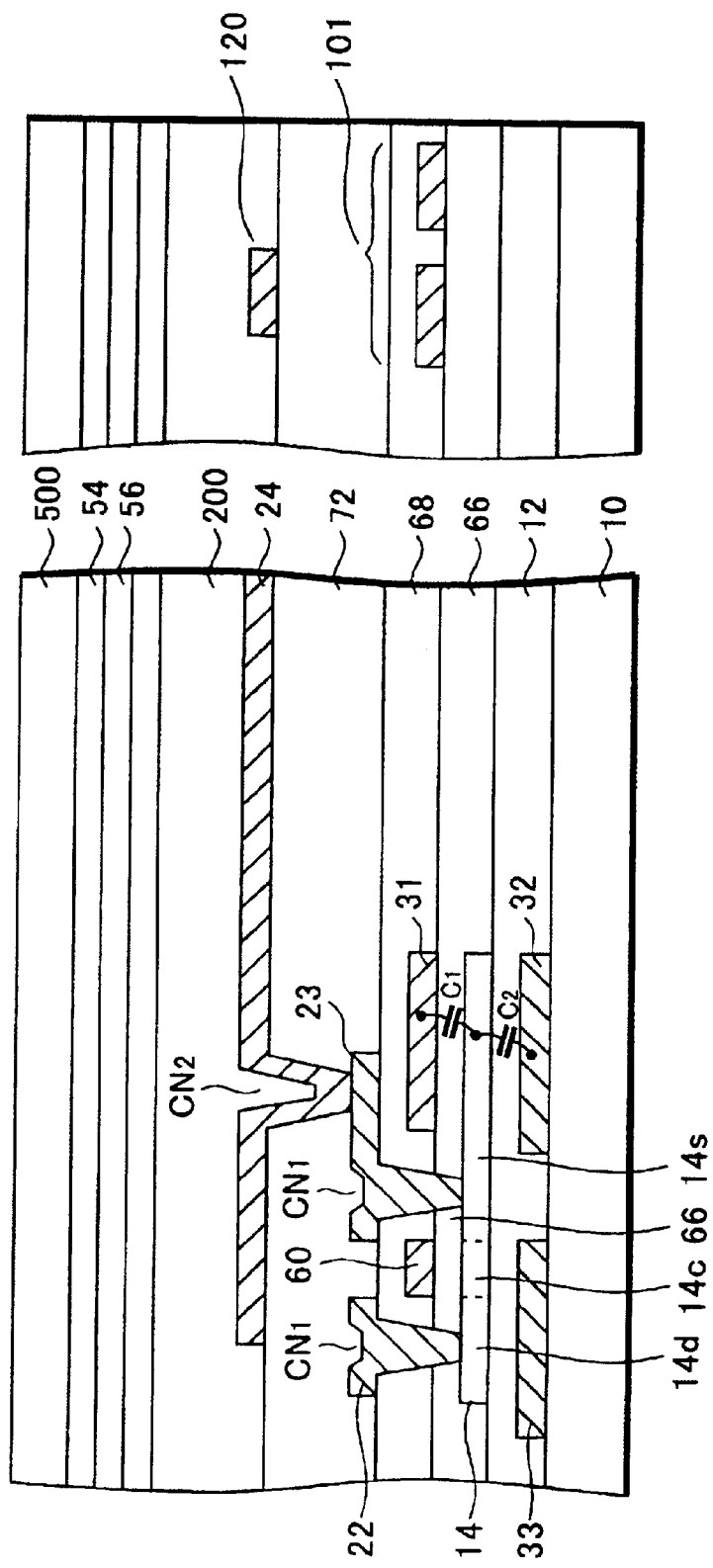
FIG. 1 is a cross-sectional view showing a display pixel and a peripheral portion of an active matrix LCD device of an embodiment of this invention.

An embodiment of this invention will be described in detail with reference to FIGS. 1-3. A LCD device will be described as an example, though this invention may be applicable to other type of display device. An explanation will be made by using a LCD as an example. FIG. 1 is a cross-sectional view of a display pixel in this active matrix LCD of this embodiment.

The LCD has a first substrate 10 made of transparent insulating material such as glass, a second substrate 500 and a liquid crystal 200 placed between the two substrates.

Figure 3:
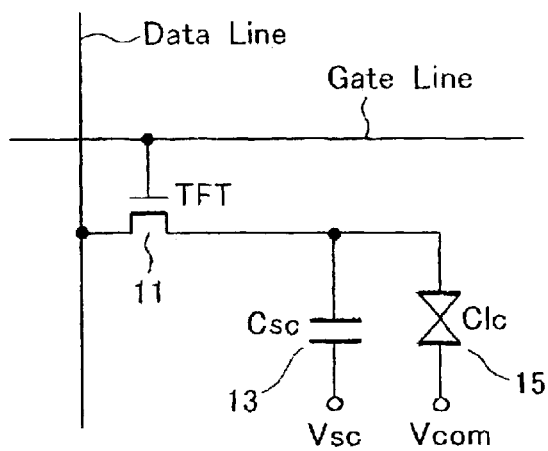
FIG. 3 is a circuit diagram of an equivalent circuit of a display pixel of an active matrix LCD device.
Figure 4:
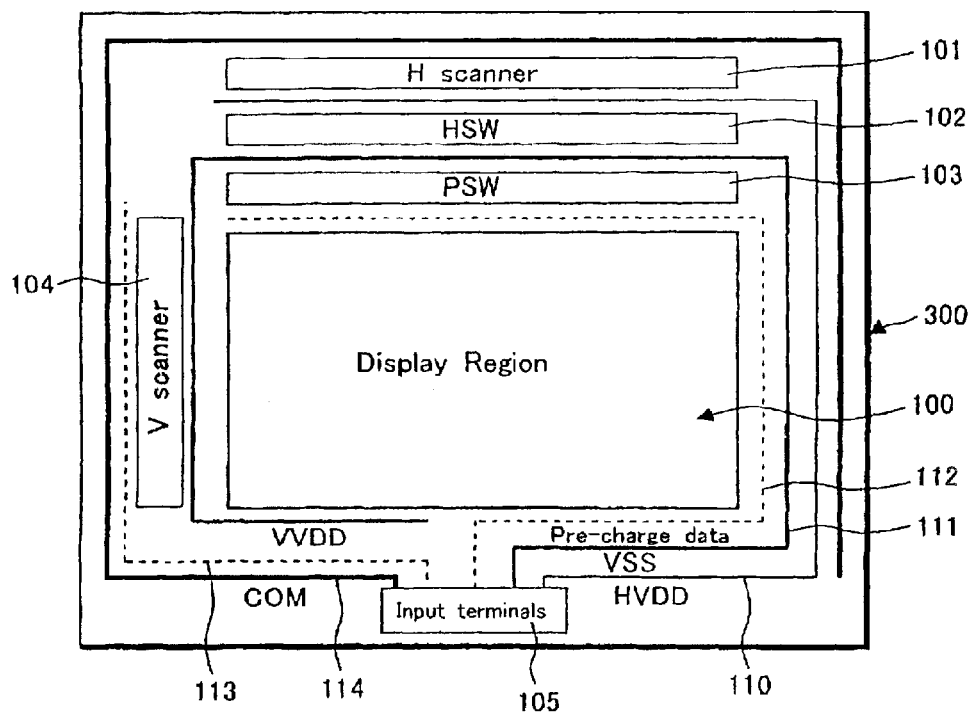
FIG. 4 is a plan view of a conventional LCD panel.

An equivalent circuit of each of the pixels is the same as shown in FIG. 3. Pixel electrodes 24 are disposed on the first substrate 10 shown FIG. 1. A top gate type TFT is placed for each of the pixel electrodes.

A gate insulating layer 66 is formed on a channel region 14c disposed in an active layer 14 (for example, a poly-silicon layer) of the TFT. A gate electrode 60 (for example, a molybdenum layer) is formed on the gate insulating layer 66. The gate electrode 60 is covered with an interlayer insulating film 68. Also, a drain 14d of the active layer 14 is connected to a data line 22 (for example, an aluminum layer) extending in a row direction through a contact hole CN1 formed in the gate insulating layer 66 and the interlayer insulating film 68.

A source 14s of the active layer 14 is connected to an electrode 23 through a contact hole CN1 formed in the gate insulating layer 66 and the interlayer insulating film 68. The electrode 23 is connected to the pixel electrode 24 (for example, a reflection electrode made of an aluminum layer) located in an upper layer through a contact hole CN2 formed in a thick flattening insulating film 72 (with a thickness of 1.2 μm).

Also, a storage capacitance element Csc is connected to the source 14s of the active layer 14. The storage capacitance element Csc is configured from two storage capacitance elements C1 and C2 connected in series. The storage capacitance element C1 includes the source 14s of the active layer 14 and the electrode 31 located in the insulating layer 68 that is above the gate insulating layer 66. Accordingly, the gate insulating layer is disposed between the electrode 31 and the active layer 14. The electrode 31 is formed in the same layer as the layer where the gate electrode 60 is formed.

The storage capacitance element C2 includes the source 14s of the active layer 14 and the electrode 32 located in the insulating layer 12 that is above the first substrate 10. Accordingly, the insulating layer 12 is disposed between the active layer 14 and the electrode 32. The electrode 32 is formed in the same layer as the layer where a light blocking layer 33 (for example, a Cr layer) for blocking the light coming from the first substrate 10 side is formed.

Since the storage capacitance element Csc is configured from the two storage capacitance elements C1, C2 connected in series to the source 14s of the active layer 14, the storage capacitance quantity per unit device area is larger compared to the case where only one storage capacitance element is connected. When the gate insulating layer 66 and the insulating layer 12 have the same thickness (for example, 0.1 μm), the storage capacitance value per unit device area is doubled. Therefore, it is possible to make the area for the storage capacitance element smaller, leading to the improved aperture ratio of the display pixel.

A common electrode 56, to which a common voltage VCOM is applied, and a color filter 54 are disposed on the second substrate 500, which is disposed facing to the first substrate 10. The liquid crystal 200 aligns itself according to the voltage applied between each of the pixel electrodes 24 and the common electrode 56 facing each other with the liquid crystal 200 between them, providing the liquid crystal display.

Figure 2:
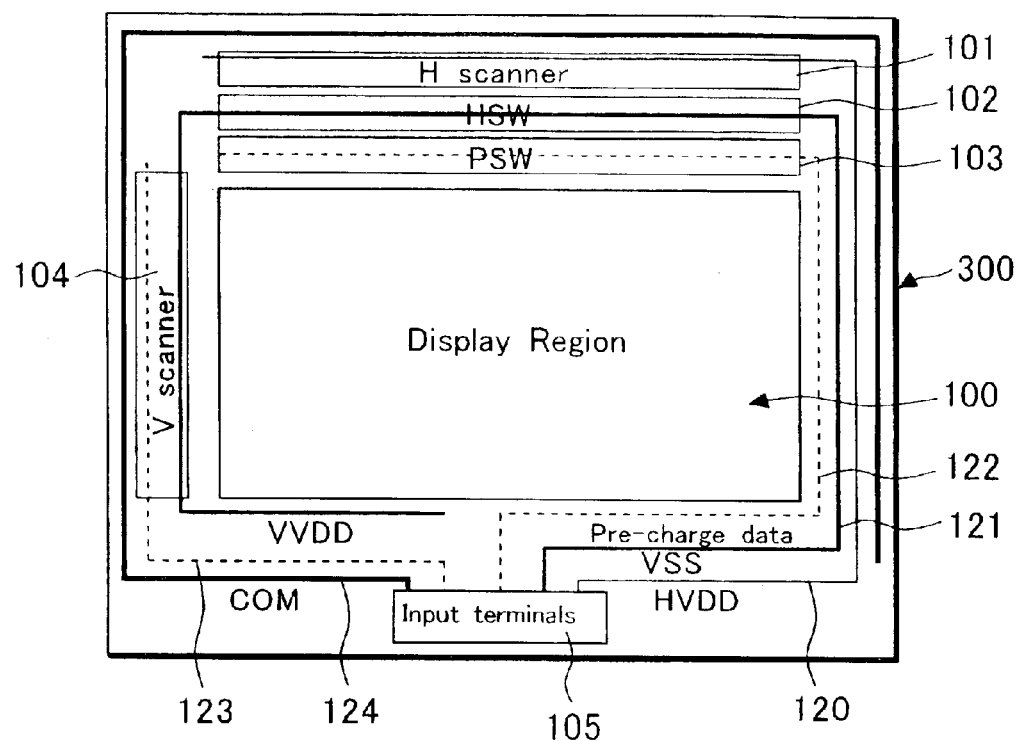
FIG. 2 is a plan view of a LCD panel of the embodiment of this invention.

FIG. 2 shows a whole view of an LCD panel 300 of this embodiment. A display region 100 is disposed in the middle of the LCD panel 300. The display pixels shown in FIG. 1 are disposed in a matrix configuration on the display region 100. Peripheral driving circuits including an H scanner 101, an HSW circuit 102, a PSW circuit 103, a V scanner 104 and other elements and a group of input terminals 105 are disposed around the display region 100.

An HVDD (a source voltage for the H scanner), a VSS (an earth voltage), a pre-charge data, a VVDD (a source voltage for the V scanner) and a VCOM (a common voltage) are inputted from the group of input terminals 105, and an HVDD bus line 120, a VSS bus line 121, a pre-charge data bus line 122, a VVDD bus line 123, and a COM bus line 124 corresponding to the above voltages are disposed near the inside wall of the LCD panel 300. These various bus lines 120–124 supply the data and the voltages necessary for the peripheral driving circuits.

A feature of this embodiment is to form the various bus lines 120–124 in the same layer as the layer of the pixel electrode 24. Also, the peripheral driving circuits are formed by using layers of, for example, the gate electrode 60 (molybdenum layer), the data line 22 (aluminum layer) and the active layer 14 of the TFT, which are lower than the layer of the pixel electrode 24.

The pixel electrode 24 of a transmitting-type LCD is made of a transparent conductor such as ITO. However, ITO is not a proper material for circuit wiring, as it has a low conductivity. Accordingly, the pixel electrodes 24 have not been used for circuit wiring either in the reflection-type LCD or the transmitting-type LCD, because the two types of LCD devices share the same circuit design for reducing the development costs. However, in this embodiment the pixel electrode 24 is made of a metal layer such as aluminum, which has a good conductivity, and the aluminum layer that is formed in the same layer as the pixel electrode 24 is used as the wiring for the peripheral driving circuit. Accordingly, this embodiment utilizes a reflection-type LCD.

The area of the peripheral region (framing area) of the LCD panel 300 can be reduced by superimposing the bus lines on the peripheral driving circuits. The size of the LCD panel 300 as a whole can be reduced, while keeping the size of the display region 100 at a maximum size possible.

Additionally, the pixel electrode 24 is formed on the thick flattening insulating film 72 having a thickness of 1.2 μm and has an enough distance to the layer below. Therefore, when the bus lines 120–124 are formed in the same layer as the layer of the pixel electrode 24 and superimposed on the peripheral driving circuits such as scanners, capacity coupling between the bus line and circuit elements, such as transistors in the peripheral driving circuits, would not take place. The preferable wiring formed in the same layer as the layer of the pixel electrode 24 is the bus lines 120–124.

In the conventional designs of LCD device, the bus lines are formed in the same layers as those of the peripheral driving circuit. Accordingly, the wiring should be as narrow as possible for the reduction of the framing area, which leads to an increase in resistance of the wiring. However, it is possible in this embodiment to form the bus lines 120–124 wide enough to reduce the resistance, leading to the low-energy consumption of the LCD.

It is preferable to superimpose the bus line on the circuit, to which this particular bus line is connected. For example, the HVDD bus line 120 should be superimposed on the H scanner 101, the VSS bus line 122 on the HSW circuit 102 and the V scanner 104, the pre-charge data bus line 122 on the PSW circuit 103, and the VVDD bus line 123 on the V scanner 104. When the bus line is superimposed on the circuit, to which this particular bus line is connected, the bus line and the circuit are located close to each other, leading to the easy layout of the circuit design. This makes the framing area even smaller.

Also, the HVDD bus line 120 and the VSS bus line 121 are disposed in the right side in FIG. 2. But it is also possible to superimpose these bus lines on the V scanner 104. These bus lines are the bus lines for supplying the source voltage, which does not change over the time. The voltage of the pre-charge data bus line, however, changes over the time. Even with the flattening insulating film 72, the parasitic capacitance can not completely be eliminated. Therefore, it should be avoided to superimpose the pre-charge data bus line on the V scanner 104 because the pre-charge data bus line operates on completely different operation timing from that of the V scanner. Likewise, the COM bus line 124 should not be superimposed on the V scanner 104 when AC driving is adopted.

Accordingly, in this embodiment the bus lines are disposed around the display region with great designing flexibility. Furthermore, the framing area of the display device is significantly reduced when the bus line is disposed over the peripheral driving circuit.

What is claimed is:

1. A display device having a plurality of wiring layers, comprising:

a display region comprising a plurality of display pixels;

a peripheral driving circuit that supplies a driving signal to each of the display pixels and is disposed outside the display region;

a bus line that supplies a voltage to the peripheral driving circuit; and a pixel electrode disposed for each of the display pixels, wherein the bus line and the pixel electrodes are disposed in one of the wiring layers, and at least a portion of the peripheral driving circuit is disposed in a wiring layer that is disposed below the wiring layer of the bus line and the pixel electrodes.

2. The display device of claim 1, further comprising a thin film transistor disposed for each of the display pixels, wherein a pixel voltage is applied to the pixel electrode through the corresponding thin film transistor.

3. The display device of claim 1, wherein the bus line is superimposed on the peripheral driving circuit.

4. The display device of claim 1, wherein the bus line and the pixel electrode are made of aluminum.

5. The display device of claim 2, wherein the bus line and the pixel electrode are made of aluminum.

6. The display device of claim 3, wherein the bus line and the pixel electrode are made of aluminum.

7. A reflection-type display device having a plurality of wiring layers, comprising:

a display region comprising a plurality of display pixels;

a peripheral driving circuit that supplies a driving signal to each of the display pixels and is disposed outside the display region;

a bus line that supplies a voltage to the peripheral driving circuit; and a reflection pixel electrode disposed for each of the display pixels, wherein a wiring layer of the reflection pixel electrode includes a portion of the peripheral driving circuit or a portion of the bus line.

8. The display device of claim 7, wherein portions of the peripheral driving circuit and the bus line that are not included in the wiring layer of the reflection pixel electrode are disposed in a wiring layer that is disposed below the wiring layer of the reflection pixel electrode.

9. The display device of claim 7, further comprising a thin film transistor disposed for each of the display pixels, wherein a pixel voltage is applied to the pixel electrode through the corresponding thin film transistor.

10. The display device of claim 7, further comprising a thin film transistor disposed for each of the display pixels and an insulating film disposed between the reflection pixel electrode and the thin film transistor.

* * * * *